(12) United States Patent
Ubillos (10) Patent No.: US 8,185,823 B2
(45) Date of Patent: May 22, 2012

(54) ZOOM INDICATION FOR STABILIZING UNSTABLE VIDEO CLIPS

(75) Inventor: Randy Ubillos, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 448 days.

(21) Appl. No.: 12/429,892

(22) Filed: Apr. 24, 2009

(65) Prior Publication Data

US 2010/0083114 A1    Apr. 1, 2010

Related U.S. Application Data

(60) Provisional application No. 61/101,583, filed on Sep. 30, 2008.

(51) Int. Cl.
 *G06F 3/00* (2006.01)
 *G06F 3/01* (2006.01)
(52) U.S. Cl. ......................... 715/719; 715/716
(58) Field of Classification Search .................... 715/719
 See application file for complete search history.

(56) References Cited

U.S. PATENT DOCUMENTS

| | | | |
|---|---|---|---|
| 5,404,316 A * | 4/1995 | Klingler et al. | 715/723 |
| 7,825,963 B2 * | 11/2010 | Abdellaziz Trimeche et al. | 348/235 |
| 2006/0008152 A1 * | 1/2006 | Kumar et al. | 382/190 |

* cited by examiner

*Primary Examiner* — William Bashore
*Assistant Examiner* — Hien Duong
(74) *Attorney, Agent, or Firm* — Fish & Richardson P.C.

(57) ABSTRACT

A computer-implemented method for zoom indication for stabilizing unstable video clips is described. To indicate zoom, a zoom value associated with an unstable segment of a video clip is received. The zoom value represents a value by which frames of the video clip in the unstable segment need to be zoomed to stabilize the unstable segment. An indicia is displayed representing the zoom value in a thumbnail in a user interface. The thumbnail represents the video clip. The indicia displayed over a region in the thumbnail corresponding to the unstable segment in the video clip.

20 Claims, 10 Drawing Sheets

ZOOM INDICATION FOR STABILIZING UNSTABLE VIDEO CLIPS

CROSS REFERENCE TO RELATED APPLICATION

This application claims the benefit of the filing date of U.S. Provisional Application Ser. No. 61/101,583, filed on Sep. 30, 2008, and entitled "Zoom Indication for Stabilizing Unstable Video Clips", the entire disclosure of which is incorporated herein by reference.

TECHNICAL FIELD

This specification relates to presenting digital content, for example, digital video.

BACKGROUND

Digital video clips can be recorded using digital video cameras. While content captured using a stabilized camera, for example, a camera on a tripod or a camera on a steady-cam rig is stable, content captured using hand-held cameras can be unstable and can appear shaky. When played back in a display device, the frames in unstable segments of the video clip appear to shake because the hand-held camera was moving during recording. Video stabilization applications to stabilize unstable segments in a video clip are known. An example of a video stabilization application is SmoothCam included in Apple® Final Cut Pro™ 6, Motion™, and Shake™.

Steps to stabilize unstable segments of a video clip include compensating for the shake in the unstable segments by selecting a reference point in a frame in the unstable segment and applying an offsetting motion to each frame in a group of frames with respect to the reference point. A frame, in an unzoomed state, has a fixed length and width. If stabilization is required, some amount of offset is applied to a frame. Any amount of offset will cause a black edge at the opposite side to appear, requiring some amount of zoom to eliminate the black edge. To avoid such scenarios, the frames in the unstable segment are zoomed in prior to applying the offsetting motion. When a frame is offset after zooming in, regions within the boundaries of the frame are available for display when the frame is offset. Depending on the amount of zooming in, the stabilized segments of the video clip also appear zoomed in. Further, zooming in to a reference point may cause portions of the frame, particularly near the edges of the frame, to be lost after stabilization.

SUMMARY

This specification describes technologies relating to zoom indication for stabilizing unstable video clips.

In one aspect, a computer-implemented method receives a zoom value associated with an unstable segment of a video clip. The zoom value represents a value by which frames of the video clip in the unstable segment need to be zoomed to stabilize the unstable segment. The method includes displaying an indicia representing the zoom value in a thumbnail in a user interface. The thumbnail represents the video clip. The indicia is displayed over a region in the thumbnail corresponding to the unstable segment in the video clip.

This, and other aspects can include one or more of the following features. The method can include receiving a selection of the indicia, and in response to the selection, displaying a new thumbnail in the user interface. The new thumbnail can include the frames of the video clip in the unstable segment. The method can further include detecting a selection of the indicia, removing frames of the video clip other than the frames of the video clip in the unstable segment, in response to the selection, and displaying an updated thumbnail in the user interface. The updated thumbnail can represent the unstable segment. The zoom value can be received from a video stabilization unit configured to stabilize unstable segments of the video clip. The method can further include providing the video clip to the video stabilization unit.

Other aspects include implementations in computer-readable media tangibly embodying software instructions which, when executed, cause one or more computers to perform the above-described methods. Additional aspects include systems including one or more computers and computer-readable media tangibly embodying a computer program product including instructions which, when executed, cause the one or more computers to perform the above-described operations.

In another aspect, a computer-implemented method includes displaying an indicia in a thumbnail representing a video clip. The indicia is displayed over an unstable segment of the video clip determined as containing unstable content. The indicia represents a first range of zoom values that include a zoom value by which frames in the unstable segment need to be zoomed to stabilize the segment to a stabilization level. The method includes receiving a new stabilization level different from the stabilization level, receiving a new zoom value corresponding to the new stabilization level, and determining that the new zoom value is included in a second range of zoom values different from the first range of zoom values. The second range of zoom values is represented by a new indicia. The method includes displaying the new indicia in place of the indicia in the thumbnail.

This, and other aspects, can include one or more of the following features. The new stabilization level can be received as a user input. The operations can further include providing the new stabilization level to the video stabilization unit, and receiving the new zoom value. The operations can further include determining that the new zoom value is greater than a threshold zoom value, wherein the displayed new indicia corresponds to a value greater than the threshold zoom value.

In another aspect, a computer implemented method includes detecting input to stabilize a video clip by a stabilization level indicating a level to which unstable segments of the video clip are to be stabilized. The video clip is represented by a thumbnail. The method includes displaying multiple indicia in a thumbnail over multiple regions corresponding to multiple unstable segments of the video clip. The multiple indicia represent a corresponding multiple zoom values by which the multiple unstable segments must be zoomed to stabilize the multiple unstable segments by the stabilization level. The method includes receiving a new stabilization level causing the multiple zoom values to be changed to a corresponding multiple new zoom values and, in place of the multiple indicia, displaying multiple new indicia corresponding to the multiple new zoom values.

This, and other aspects, can include one or more of the following features. The multiple indicia can be represented by corresponding multiple colored lines. The operations can further include detecting an input to not stabilize the video clip, and, in response to the input, removing the multiple indicia from the thumbnail.

Particular implementations of the subject matter described in this specification can be implemented to realize one or more of the following advantages. Displaying indicia representing zoom values over thumbnails in which the unstable segments are displayed can allow a user to view segments of a video clip on which stabilization operations will be performed. Further, the type of indicia displayed can indicate to a user, a level by which an unstable segment will be zoomed in. Based on this indication, the user can decide whether to continue stabilization at a present stabilization level or to decrease a stabilization level to decrease the zoom values. If the user decides to decrease the stabilization level, then indicia representing zoom values determined by a video stabilization unit, based on the new stabilization level can be displayed to the user. In this manner, the user can be provided a feedback mechanism that indicates to the user, the zooming operations that will be performed on a video clip for stabilization.

The details of one or more implementations of the specification are set forth in the accompanying drawings and the description below. Other features, aspects, and advantages of the specification will become apparent from the description, the drawings, and the claims.

BRIEF DESCRIPTION OF THE DRAWINGS

Like reference numbers and designations in the various drawings indicate like elements.

DETAILED DESCRIPTION

Video clips can be displayed in a user interface in a display device, for example, in thumbnail groups, each group including one or more thumbnails. Some of the segments displayed in a thumbnail group can be unstable, such that content in an unstable segment appears to shake when played back in the display device. Using techniques that are described below, indicia can be displayed in a thumbnail over regions corresponding to unstable segments of a video clip to allow a user to make decisions regarding levels by which content in the unstable segment can be stabilized.

Figure 1:
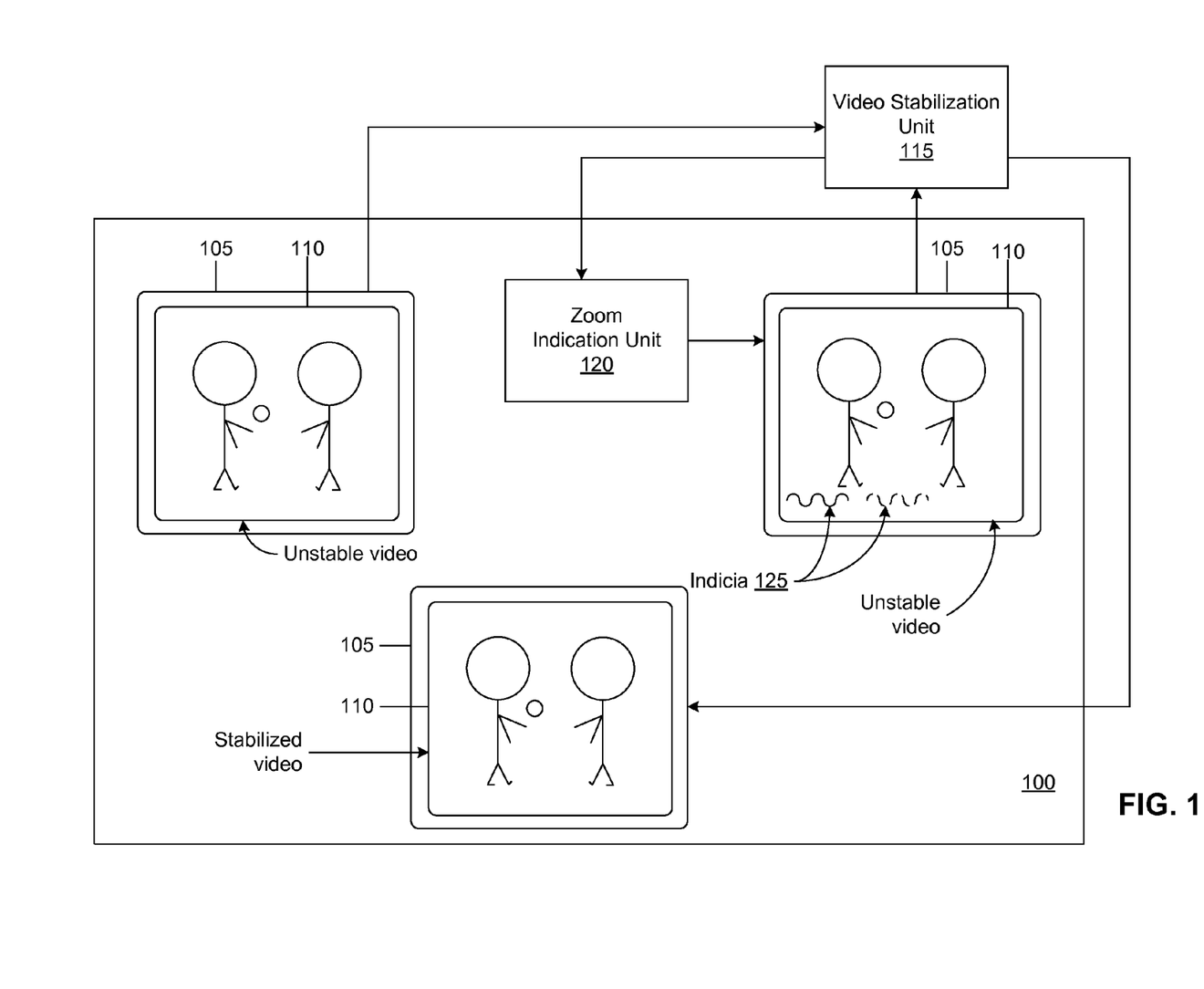
FIG. 1 is a schematic of a system 100 for indicating zoom values for unstable segments of a video clip.

FIG. 1 is a schematic of a system 100 for indicating zoom values for unstable segments of a video clip. The system 100 includes a user interface 105 that is displayed in a display device, for example, a monitor of a computer system. In some implementations, a video clip is displayed in a thumbnail 110 in the user interface 105. The thumbnail 110 displays an image corresponding to a frame of the multiple frames of the video clip. In the thumbnail 110, one or more segments of the video clip can include unstable content, such that frames in each unstable segment appear to shake when the video clip is played back in the user interface 105.

The system 100 can be operatively coupled to a video stabilization unit 115 to stabilize the video clip. The video stabilization unit 115 can receive the video clip including unstable segments from the system 100 and provide, as an output, a stabilized video clip. To do so, the video stabilization unit 115 can perform the step of zooming in the frames of the unstable segments. Upon zooming, the video stabilization unit 115 can determine an offset of a point in successive frames from a reference point in one frame and re-arrange the images in each frame to counter the offset. Thus, by countering the offset in multiple frames, the video stabilization unit 115 can stabilize the unstable segments. The unit 115 can zoom in the frames of the unstable segment by a value that can depend on a level by which the unstable segments need to be stabilized.

For example, at a highest stabilization level, the unit 115 can entirely remove the appearance of shake from the frames of the unstable segment. As a result, a zoom value that the unit 115 applies to one or more frames of the stabilized segments can be so high that portions of the frame, particularly near the boundaries of the frame, in the unstable segments are not visible in the stabilized segments. At an intermediate stabilization level, the unit 115 can zoom in a frame in the unstable segment so that a significant portion of the frame is still visible in the stabilized segment. However, the stabilized segment can still include content that appears to shake, although not as much as the content in the unstable segment.

The video clip displayed in the thumbnail 110 can include multiple segments, each segment including one or more frames of the video clip. Further, each segment can display different levels of shake. Thus, the video stabilization unit 115 can apply different zoom values to the frames in each segment to obtain the same stabilization level. For example, if a highest stabilization level is applied to an unstable segment, then the video stabilization unit 120 can determine that frames in one unstable segment need to be zoomed in by a zoom value of 1.1× while frames in another unstable segment need to be zoomed in by a zoom value of 1.4×.

The system 100 can receive the zoom values that the video stabilization unit 115 needs to apply to the unstable video clip. The system 100 can include a zoom indication unit 120 that can display, on the thumbnail 105, indicia representing the zoom values that the system 100 has received from the video stabilization unit 115. The zoom indication unit 120 can display one or more indicia over corresponding one or more regions of the thumbnail 110. Each region can correspond to an unstable segment of the video clip. Each indicia can represent a corresponding zoom value.

For example, the zoom indication unit 120 can display over one region of the thumbnail 110, an indicia indicating that a zoom value of the frames, as determined by the video stabilization unit 115, is 1.1×. The indicia can be, for example, a solid line. This indicates to a user that frames in the video clip that are in the segment corresponding to the region where the solid line is displayed will be zoomed in by 1.1× for stabilization. Similarly, the zoom indication unit 120 can display over another region of the thumbnail 110, a dotted line indicating that a zoom value of the frames in the segment corresponding to that region is 1.3×. The choice of the type of indicia displayed over the thumbnail can vary. Although illustrated as solid and dotted lines in FIG. 1, it is to be understood that any type of indicia can be used, for example, colored lines, symbols, or combinations of both.

By presenting indicia obtained from the video stabilization unit 115 over regions of the thumbnail 110, the system 100 can inform a user that large or small portions of the frames of the unstable video will be lost after stabilization. For example, for either a default stabilization level or for a stabilization level received from the user, the video stabilization unit 115 can determine that a zoom value necessary for stabilization is 1.5×. Based on a threshold zoom value, the system 100 can determine that stabilizing the unstable segment using such a high zoom in value will result in significant loss of portions of frames in the unstable segment. The indicia displayed over the thumbnail 110 can represent such a high zoom value and can be a suggestion that a user either decrease the stabilization level or consider skipping stabilization entirely.

Conversely, if the indicia displayed on the thumbnail 110 indicates that additional stabilization can be applied to the video clip without significant loss of portions of frames, then the user can increase the stabilization level. In response to the type of indicia displayed, a user can alter a stabilization level to be applied to the video clip. The video stabilization unit 115 can re-compute the zoom values to be applied to the unstable segments in the video clip and provide the re-computed values to the zoom indication unit 120. In response, the zoom indication unit 120 can update the indicia displayed on the thumbnail 110. Subsequently, the video stabilization unit 115 can perform the steps of stabilizing the video clip and display the stabilized video in the thumbnail 110. In this manner, a user can control a stabilization level applied to a video clip upon viewing indicia representing zoom values displayed over video clips.

Figure 2A:
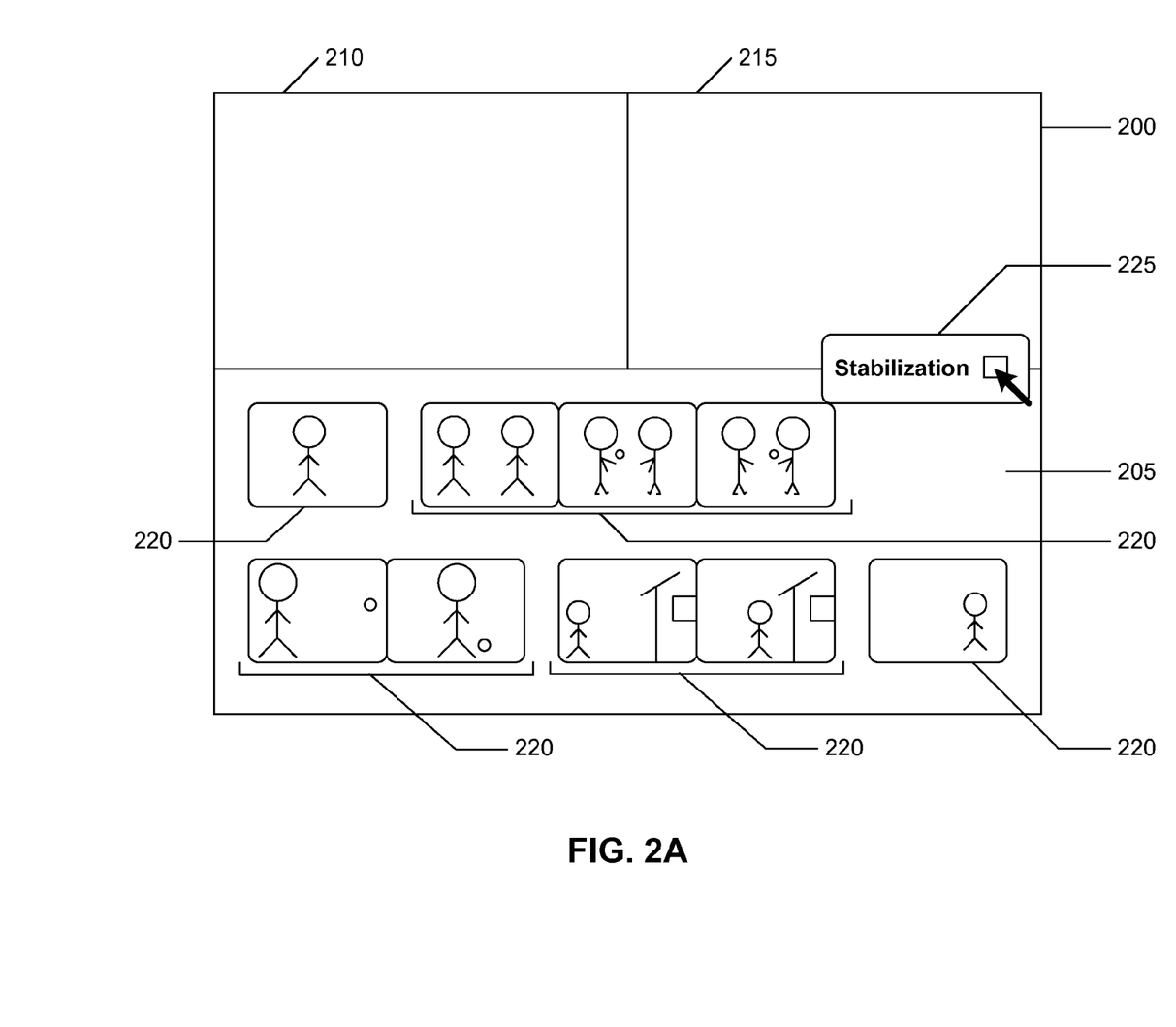
FIG. 2A is a schematic of a user interface including multiple panes for displaying thumbnail groups.

FIG. 2A is a schematic of a user interface 200 including multiple panes for displaying thumbnail groups. In some implementations, multiple video clips can be displayed in a project pane 205 of a user interface 200. The user interface 200 can also include an edit pane 210 and a view pane 215 which are described below. The user interface 200 can be displayed in a display device, for example, a computer monitor of a computer system that is operatively coupled to a storage medium in which multiple video clips are stored.

Each video clip in the storage medium can be displayed in a corresponding thumbnail group 220, each thumbnail group 220 including one or more thumbnails. For example, a thumbnail group 220 containing one thumbnail can display an entire video clip. Alternatively, in a thumbnail group 220 containing three thumbnails, the video clip can be distributed across the three thumbnails, each thumbnail displaying a segment of the video clip. In some scenarios, the duration of a segment displayed by each thumbnail in a thumbnail group 200 can be equal. In other scenarios, a fixed duration can be associated with each thumbnail such that a segment of the video clip having the fixed duration is displayed in one thumbnail of the thumbnail group. The remainder of the video clip can be displayed in one or more other thumbnails in the group 220. In such scenarios, a duration of a segment in a thumbnail can be less than the fixed duration associated with the thumbnail.

In a default state, the video clips can be loaded into the project pane 205 and displayed in one or more thumbnail groups 220. To allow a user to perform stabilization operations on the displayed video clips, a stabilization control panel 225 can be provided. For example, the stabilization control panel 225 can be displayed in the user interface 200 in response to a selection, for example, a selection of a key on a keyboard, a mouse button, a touch screen, and the like. In some implementations, the stabilization control panel can include a check box that, when checked, can enable stabilizing unstable segments in one or more video clips displayed in the project pane 205. The video clip on which stabilization operations need to be performed can be selected by the user. Based on the selection, the stabilization operations can be performed on all the video clips in the project pane 205 or on one or more selected video clips.

Figure 2B:
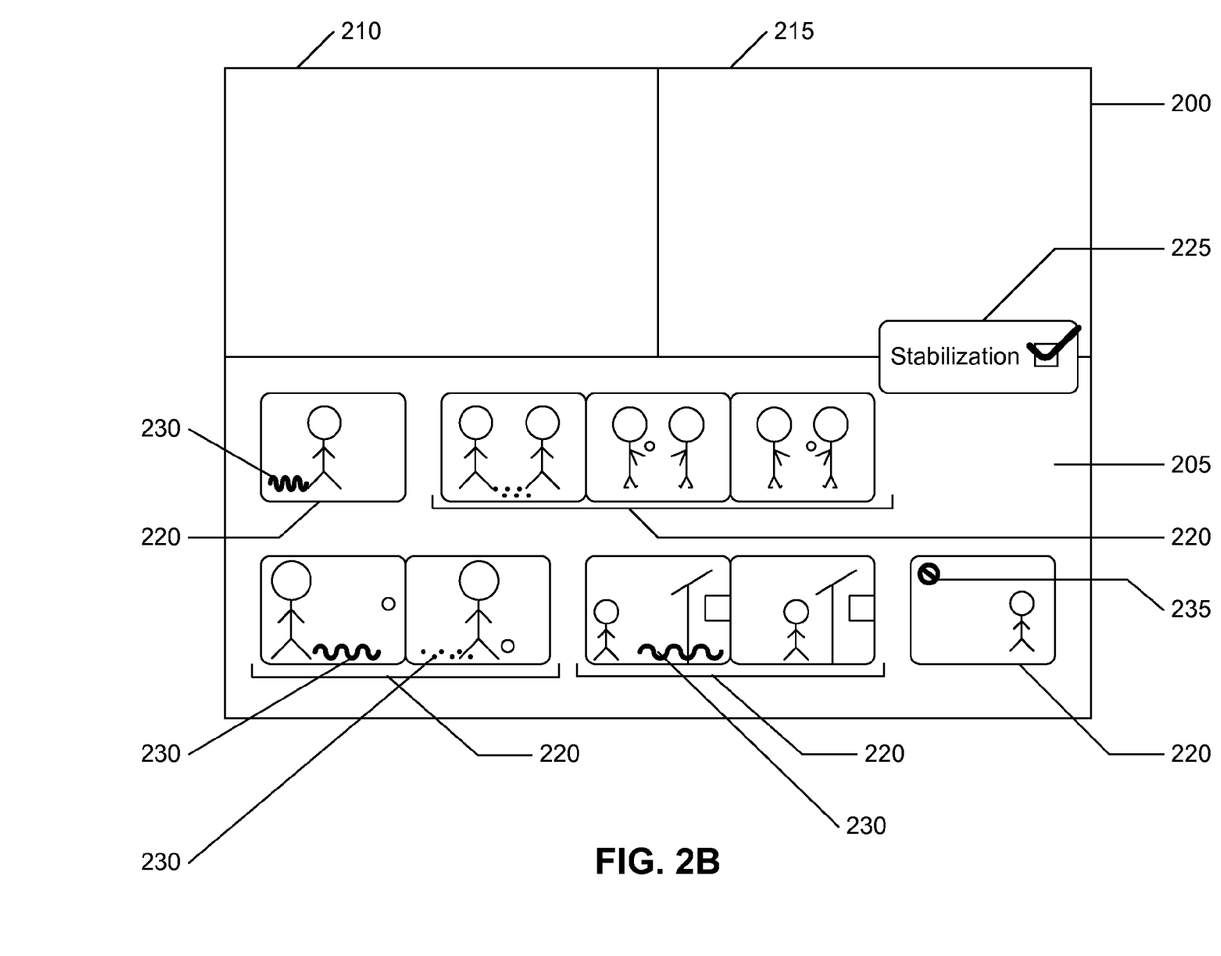
FIG. 2B is a schematic of a user interface including multiple panes for displaying thumbnail groups.

FIG. 2B is a schematic of a user interface 200 including multiple panes for displaying thumbnail groups. When the stabilization control panel 225 is selected, a check mark can be displayed in the check box on the stabilization control panel 225. A video clip displayed in a thumbnail group 220 can then be selected for stabilization. The selected video clip can be transmitted to the video stabilization unit 115 that calculates zoom values that need to be applied to stabilize the unstable segments of the video clip. These zoom values can be received by the system 100. The zoom indication unit 120 can display indicia representing zoom values over regions of the thumbnail group 220 that correspond to unstable segments in the video clip. To do so, the system 100 can divide the thumbnail group 220 into multiple regions.

The system 100 can divide each thumbnail of the thumbnail group 220 into regions, such that one or more frames of the video clip correspond to each region into which a thumbnail is divided. The regions into which a thumbnail, and consequently, a thumbnail group 220, are divided can be treated as being arranged in a sequence which corresponds to a sequence in which frames of the video clip are arranged.

A sequence in which the regions in the thumbnail group 220 are arranged starting from a left edge of a first thumbnail in the thumbnail group 220 and ending at a right edge of a last thumbnail in the thumbnail group 220 can correspond to a sequence of frames in the video clip starting from the first frame and ending at the last frame. For example, if the thumbnail group 220 consists of one thumbnail, and if a video clip consisting of 400 frames is displayed in a thumbnail group 220 including one thumbnail, then the system 100 can divide the thumbnail into four regions (RI, RII, RIII, and RIV) from the left edge of the thumbnail to the right edge of the thumbnail. Further, the system 100 can associate frames 1-100, 101-200, 201-300, and 301-400 to RI, RII, RIII, and RIV, respectively. Similarly, in scenarios where a thumbnail group 220 includes multiple thumbnails, the system 100 can associate frames in the video clip to a region in each thumbnail of the thumbnail group 220.

In the example described above, the system 100 can additionally divide the thumbnail into regions RV, RVI, and the like. In some implementations, the system 100 can associate frames in the video clip to regions RV and RVI. Alternatively, regions RV and RVI can have no corresponding frames, such that when displayed in the user interface 200, regions RV and RVI appear empty. Having divided the thumbnail group 220 into regions, the system 100 can display indicia 230 representing zoom values in each thumbnail of the thumbnail group 220. The system 100 can display the indicia 230 over the regions in the thumbnail group 220 that correspond to the unstable segments of the video clip. The system 100 can receive the zoom values from the video stabilization unit 115.

In some implementations, to display the indicia 230 as described above, the system 100 associates a received zoom value with the frame that needs to be zoomed in. For example, the system 100 assigns the zoom value to the frame as frame metadata. Thus, the system 100 assigns to each frame in an unstable segment, a corresponding frame metadata that represents a value by which the frame needs to be zoomed in. Similarly, the system 100 also associates an indicia 230 for each received zoom value and stores this association, for example, as a table in a computer-readable medium that is operatively coupled to the zoom indication unit 120. For example, the table can include a column of zoom values and another column of corresponding colors for the zoom values.

The zoom indication unit 120 retrieves the association relating indicia 230 to zoom values from the computer-readable medium. Based on the association, the zoom indication unit 120 can display the indicia 230 corresponding to the zoom value of a frame over the region in the thumbnail group 220 corresponding to the frame. The zoom indication unit 120 can repeat this step for all frames in the unstable segments. For example, if the color red is associated with a zoom value of 1.5×, then the zoom indication unit 120 can display red lines over all regions in the thumbnail 220 that correspond to frames that need to be zoomed by 1.5× for stabilization. In this manner, the zoom indication unit 120 displays indicia 230 over regions of the thumbnail group 220 that correspond to all frames in all unstable segments in the video clip.

In the implementation described with reference to FIG. 2B, an indicia 220 is applied to each zoom value. In some implementations, the same indicia 220 can be applied over a range of zoom values. For example, the system 100 can form an association between a color, for example, red, and a range of zoom values, for example, 1.4×-1.5×. From the zoom values received from the video stabilization unit 115, the system 100 can determine a highest value of all zoom values that need to be applied to all frames in an unstable segment. The system 100 can transmit this highest value to the zoom indication unit 115 that can identify the range of zoom values within which the highest zoom value falls. Subsequently, the zoom indication unit 115 can display the indicia 230 associated with the identified range over the region in the thumbnail group 220 corresponding to all the frames in the unstable segment.

Alternatively, the system 100 can determine the lowest value of all zoom values that need to be applied to all frames in an unstable segment. The zoom indication unit 115 can identify a range of zoom values within which the lowest zoom value falls, and can display the corresponding indicia 230 over the unstable segment in the thumbnail. The displayed indicia 230 represents a lowest zoom value that the video stabilization unit 115 needs to apply to stabilize even the least shaky portions of content in the unstable segment.

In some implementations, the video stabilization unit 115 can determine that one or more frames in the video clip are stable and therefore do not need to be zoomed. The system 100 can apply a metadata indicating that no indicia need be displayed over the region corresponding to such frames. Alternatively, the system 100 can apply no metadata to these frames. When the zoom indication unit 120 determines that a frame does not have metadata representing indicia, the unit 120 does not apply any indicia over the frame.

In some implementations, the system 100 can determine that a zoom value received from the video stabilization unit 115 is so high that zooming in will be undesirable. The system 100 can display in the thumbnail, an indicia 235 indicating the undesirability of stabilizing such an unstable segment. The system 100 can make a determination regarding the undesirability by comparing the received zoom value with a threshold value, the details of which will be explained with reference to FIG. 6.

In this manner, the system 100 can display indicia over regions of the thumbnail based on the frame metadata associated with thumbnails corresponding to the regions. Such frame metadata represent zoom values necessary for video stabilization. The system 100 can be configured to provide a default stabilization level that represents a level by which the unstable segments need to be stabilized. In some implementations, the default stabilization level is 150%, and can be altered by user input, for example, upto 400%.

Figure 3A:
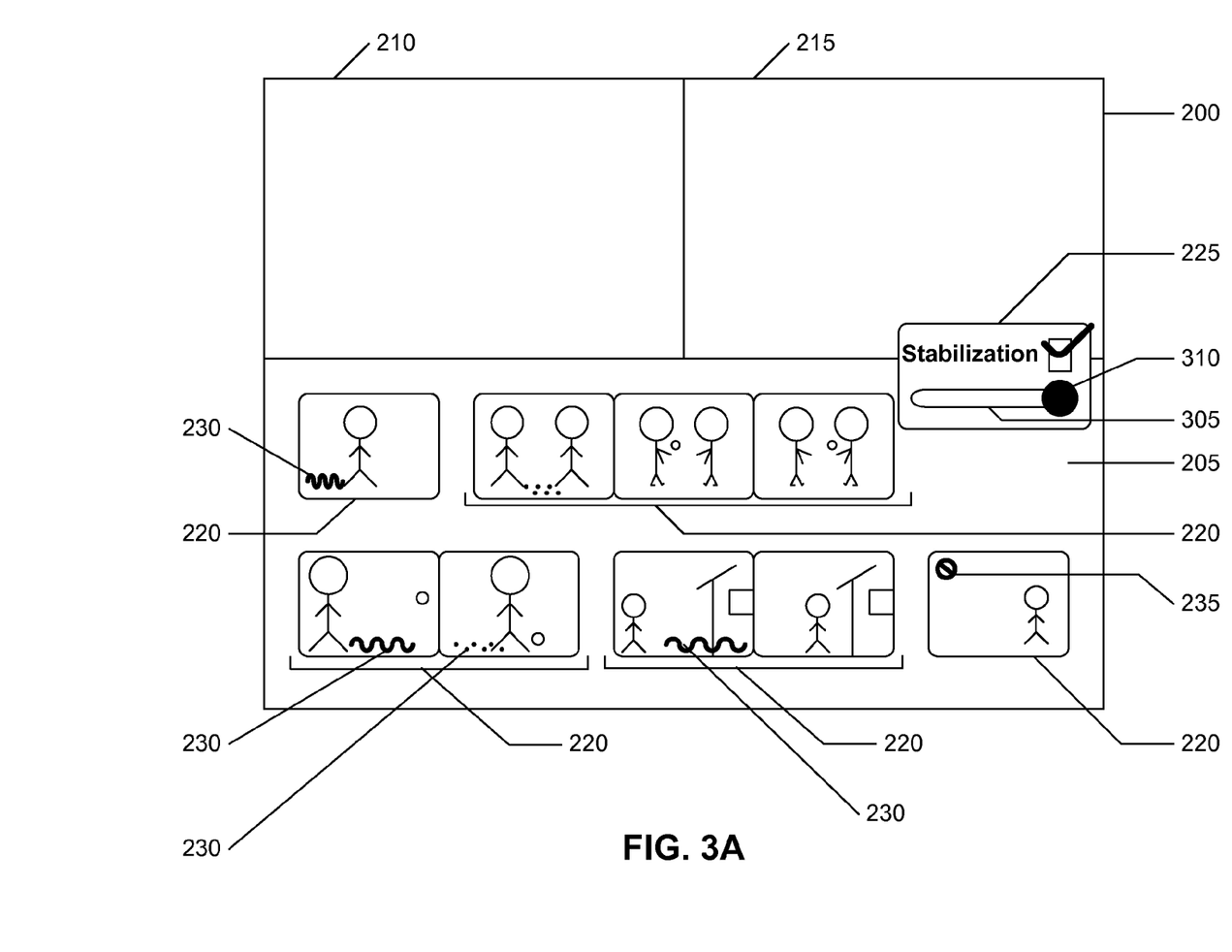
FIGS. 3A and 3B are schematics of a user interface including a stabilization level control.
Figure 3B:
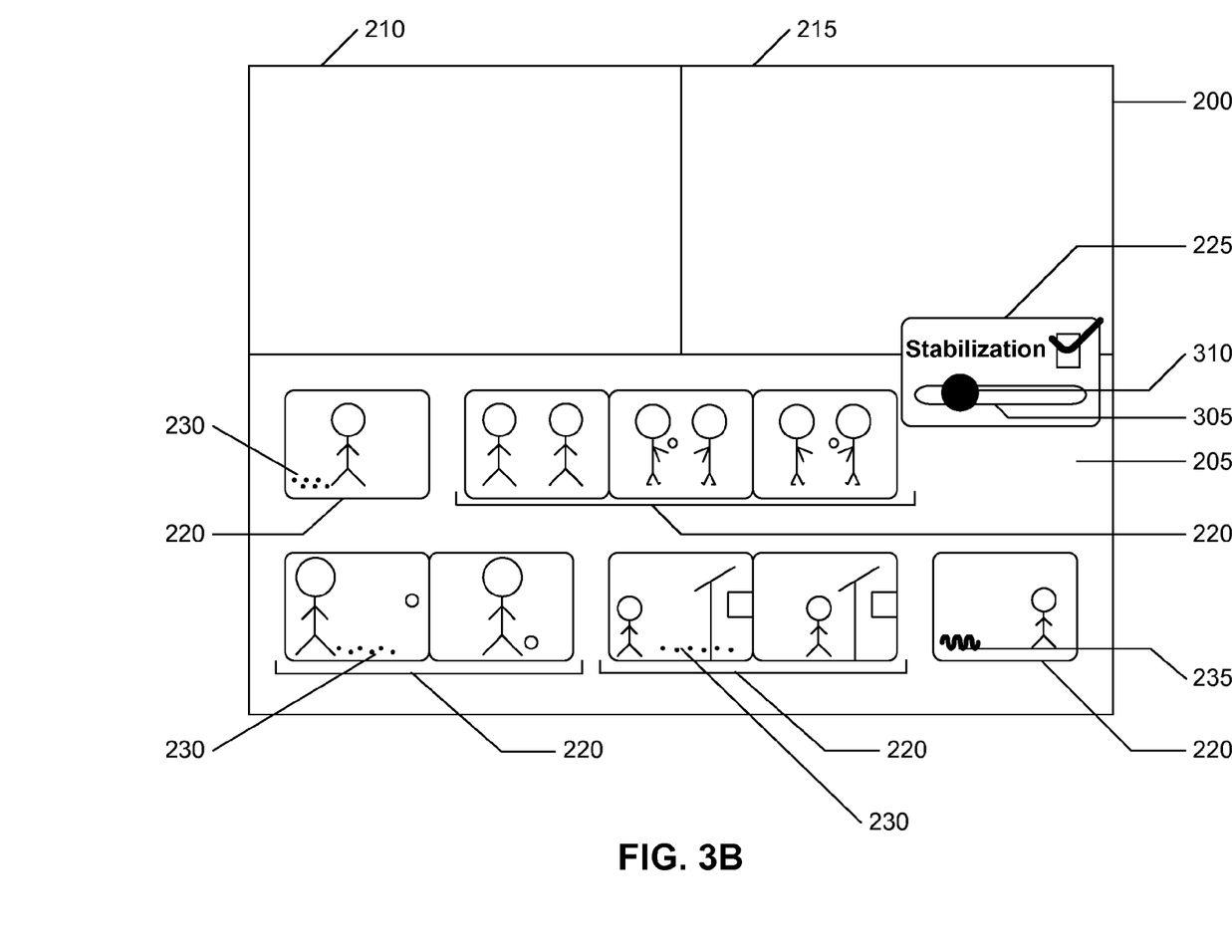

FIGS. 3A and 3B are schematics of a user interface including a stabilization level control 305. The stabilization level control 305 can be used by a user to provide a stabilization level input to the system 100. In some implementations, the stabilization level control 305 can be displayed as a slider with a button 310. A position of the button 310 in the stabilization level control 305 can represent a stabilization level that the system 100 provides to the video stabilization unit 115. In some implementations, the stabilization level control 305 can be displayed in the stabilization control panel 225. As illustrated in FIG. 3A, the button 310 is in the right most position of the control 305. This indicates that a user has selected to apply a highest available stabilization level to the unstable segments in the video clips. The system 100 can provide the selected highest stabilization level to the video stabilization unit 115, receive zoom values from the unit 115, and cause the zoom indication unit 120 to display corresponding indicia 230 and 235 on regions of the thumbnail group, as described previously.

Upon viewing the indicia 230 and 235, the user may decide that the stabilization level is too high or too low. For example, if the indicia 230 is a solid red line that indicates zoom values ranging between 1.4× and 1.5×, then the user may decide that such high zoom values will cause a loss of significant portions of the frames of the unstable segments. To avoid such losses, the user can decrease the stabilization level using the stabilization level control 305.

To do so, the user can reposition the button 310 within the stabilization level control 305, as illustrated in FIG. 3B. The stabilization level control 305 can be implemented as a slider, such that a left edge and a right edge of the slider correspond to lowest and highest stabilization levels, respectively. To decrease the stabilization level, the user can move the button 310 in the slider at or near the left edge of the slider.

In response to the repositioning, the system 100 provides the new stabilization level that the user has provided to the video stabilization unit 115. The video stabilization unit 115 re-computes new zoom values based on the new stabilization level, and provides the new values to the system 100. The system 100 receives these values, and causes the zoom indication unit 120 to update the displayed indicia to correspond to the new zoom values. For example, the zoom indication unit 120 can associate a zoom value in the range of 1.4×-1.49× with a red color solid line, and a zoom value in the range of 1.3×-1.39× with an orange color dotted line. Because the new stabilization level is less than the previous stabilization level, the new zoom values can have decreased from within the 1.4×-1.49× range to within the 1.3×-1.39× range. Consequently, the zoom indication unit 120 can replace the red color solid lines displayed over regions in the thumbnail groups 220 with orange color dotted lines.

In FIG. 3A, the indicia 235 represents an undesirability to stabilize the unstable segment. The system 100 can determine that for a stabilization level as indicated by the stabilization level control 305 in FIG. 3A, a zoom value determined by the video stabilization unit 115, is so high that doing so will result in significant loss in portions of the unstable segment. When a lower stabilization level is provided to the video stabilization unit 115, as illustrated in FIG. 3B, then the zoom indication unit 120 displays an updated indicia 230 in place of indicia 235, allowing a user to decide whether to perform stabilization operations or not.

When the new zoom values are received from the video stabilization unit 115, the system 100 updates the frame metadata that is associated with the frames in the unstable segment. Because the frame metadata is applied at least to all frames in an unstable segment and, in some scenarios, to all frames in the video clip, the system 100 can filter the display of segments.

Figure 4:
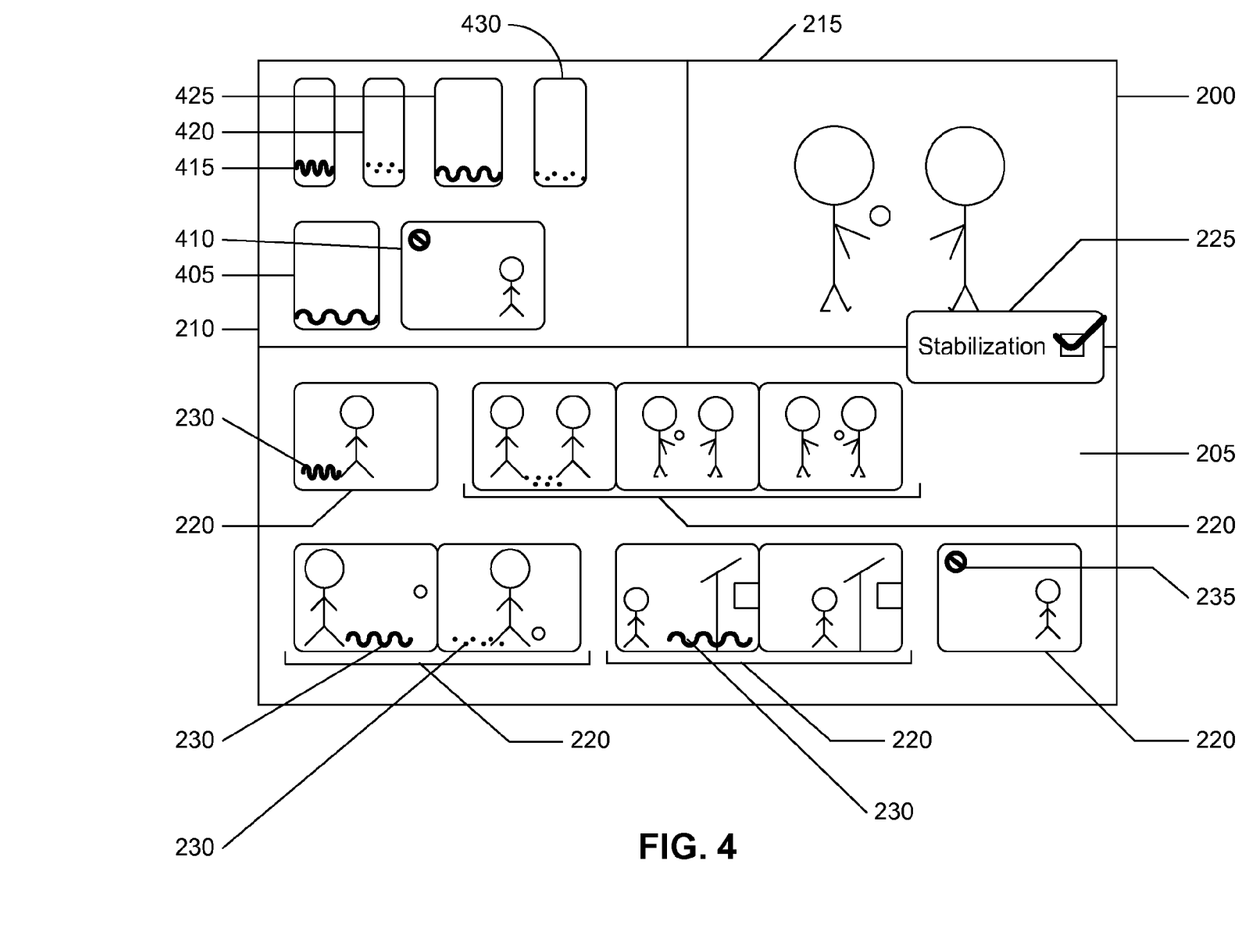
FIG. 4 is a schematic of a user interface including an edit pane to display unstable segments of a video clip.

FIG. 4 is a schematic of a user interface 200 including an edit pane 210 to display unstable segments of a video clip. In some implementations, in response to input, the system 100 can display unstable segments of the video clip in corresponding new thumbnails 405, 410, 415, 420, and 430 in the edit pane 210. For example, the user interface 200 can include a filter key (not shown), for example, a check box, a radio button, and the like. In response to a selection of the filter key, the system 100 can display all the unstable segments in corresponding new thumbnails in the edit pane 210. Alternatively, or in addition, the system 100 can detect a selection of the indicia 230, 235 that is displayed over a region of a thumbnail. For example, a user can place a cursor, controlled by a mouse or a keyboard or both, over an indicia 230, and select the indicia 230. In response, the system 100 can display in the edit pane 210, a new thumbnail, for example, thumbnail 405, that represents frames of the unstable segment that correspond to the region over which the selected indicia was displayed. Similarly, in response to a selection of the indicia 235, the system 100 displays the corresponding unstable segment in thumbnail 410.

Segments of a video clip that are displayed in the edit pane 210 can be edited. Such editing operations can include stabilizing unstable segments by providing the unstable segments to the video stabilization unit 115. Subsequent to displaying the unstable segments in new thumbnails in the edit pane, the system 100 can receive input to stabilize the unstable segments. In response, the system 100 can provide the unstable segment represented by each of the thumbnails 405, 410, 415, 420, 425, and 430, to the video stabilization unit 115, and receive stabilized segments from the unit 115. In some implementations, the stabilized segments can be displayed in thumbnails in the edit pane 210, adjacent to the thumbnails displaying the unstable segments. In some implementations, the stabilized segments can replace the unstable segments in the same thumbnails 405, 410, 415, 420, 425, and 430.

The view pane 215 is used to view the video clip, the unstable segments, the stabilized segments, and, in general, the effects of any editing operation performed on any segment of the video clip. Thus, a user can use the system 100 to identify unstable segments based on the indicia 230, transfer the unstable segments to a separate portion of the user interface 200, namely the edit pane 205, view the unstable segments in the view pane 215, and further view the stabilized segments in the view pane 215.

Figure 5:
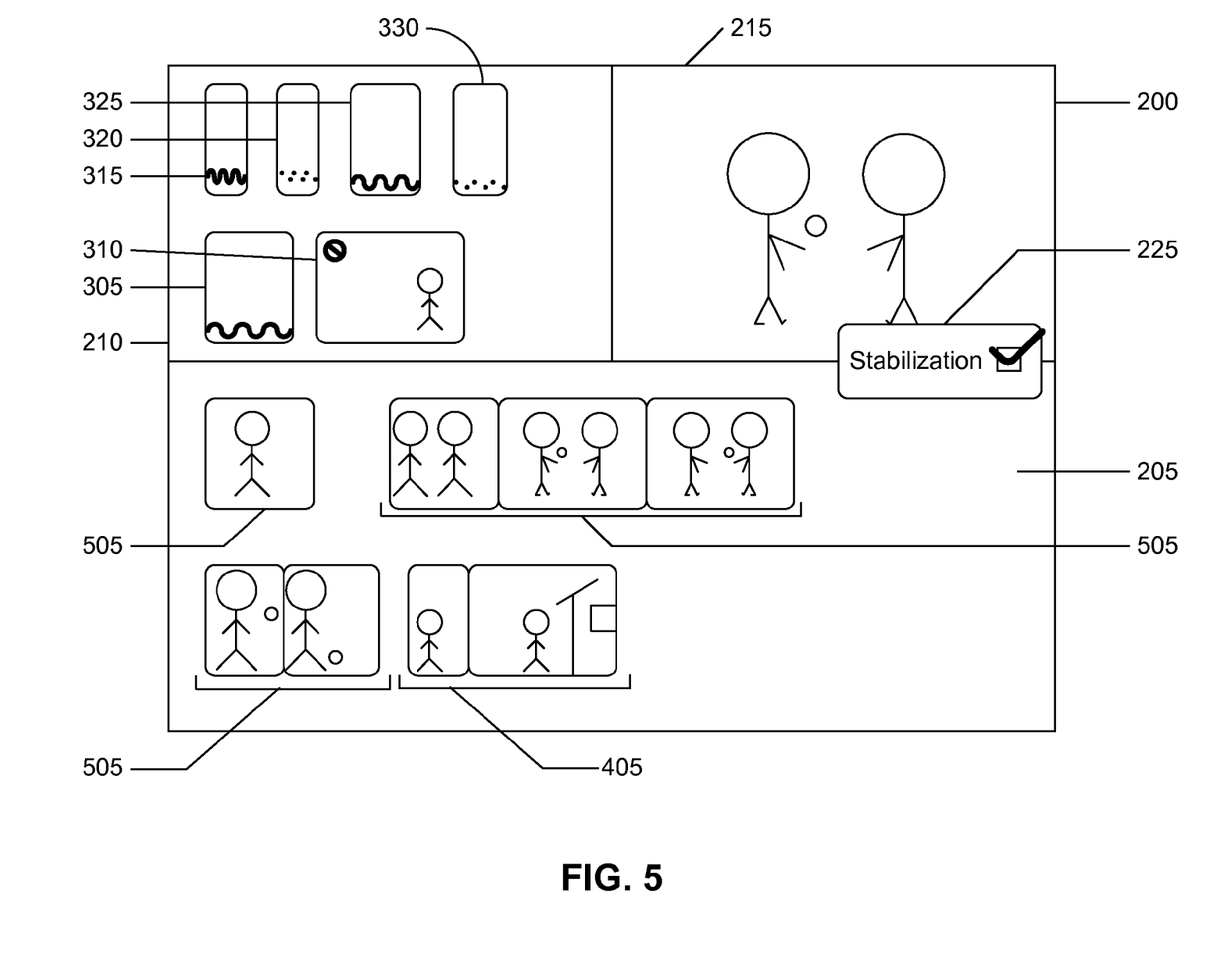
FIG. 5 is a schematic of a user interface including a project pane displaying updated thumbnails.

FIG. 5 is a schematic of a user interface 200 including a project pane 205 displaying updated thumbnails. In some implementations, when the system 100 displays unstable segments of a video clip in the edit pane 505 in response to input from a user, the system 100 can update the project pane 205 by replacing the thumbnail groups 220 with updated thumbnails 505 that display only those segments of the video clip that do not require stabilization. In some implementations, a filter key (not shown) can be selected, and in response to the selection, the system 100 can filter out all the unstable segments from the project pane 205. Alternatively, each unstable segment can be individually selected, and the system 100 can filter out the selected unstable segment.

In some implementations, in response to a selection, all the unstable segments can be deleted from the project pane 205. For example, a user can select an indicia 230 over a region in a thumbnail and select the "Delete" key. In response, the system 100 can hide the region over which the indicia 230 is displayed, from the project pane 205. Further, the system 100 can re-arrange the thumbnails in the thumbnail group 220 in which the selected region was included. The system 100 can re-arrange the thumbnails to eliminate any gaps between thumbnails.

Figure 6:
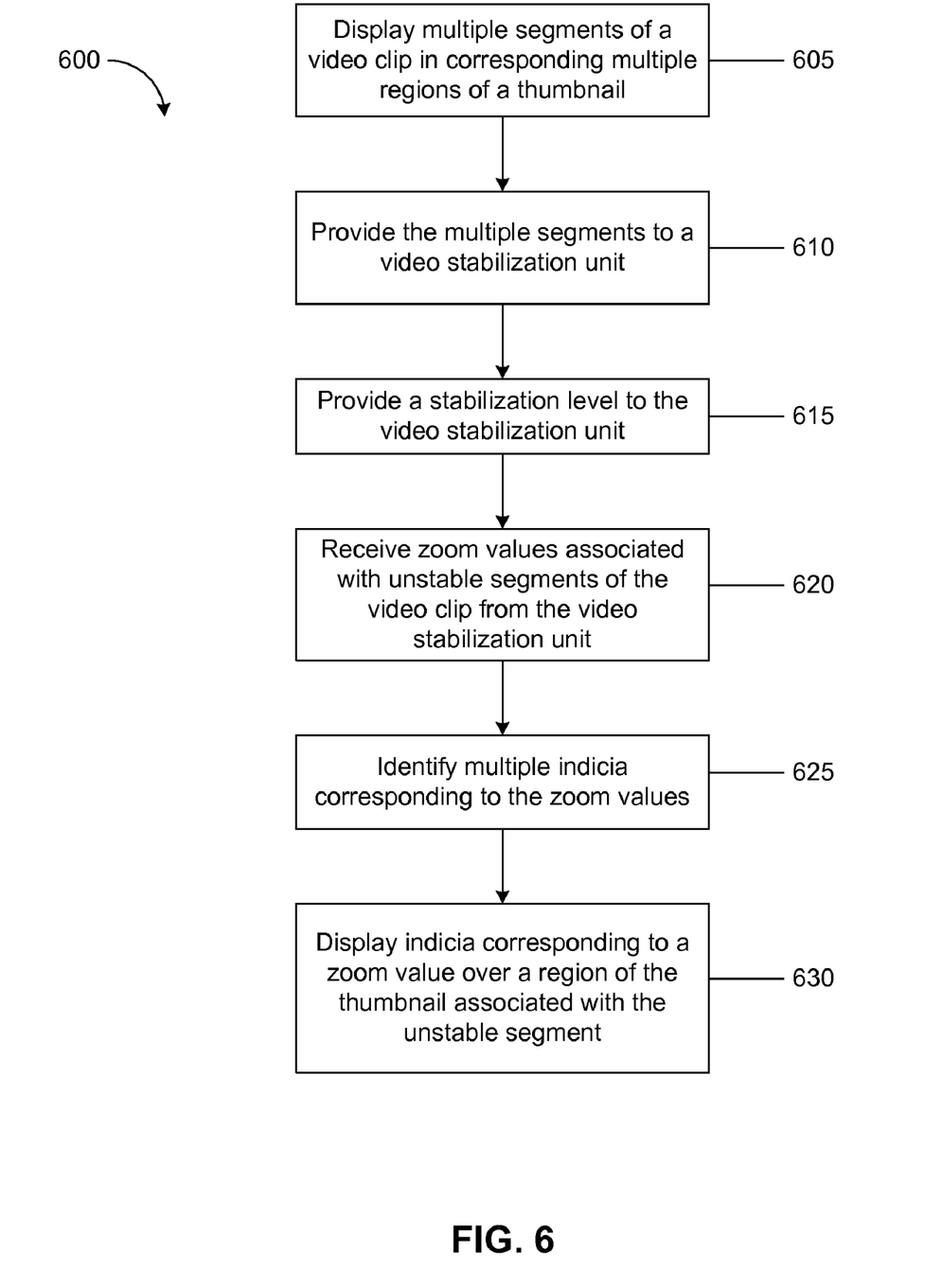
FIG. 6 is a flow chart of an example process for displaying indicia corresponding to zoom values over unstable segments in a video clip.

FIG. 6 is a flow chart of an example process 600 for displaying indicia corresponding to zoom values over unstable segments in a video clip. The process 600 displays multiple segments of a video clip in corresponding multiple regions of a thumbnail 605 (step 605). The process 600 provides the multiple segments to a video stabilization unit (step 610). The process 600 provides a stabilization level to the video stabilization unit (step 615). The process 600 receives zoom values associated with unstable segments of the video clip from the video stabilization unit (step 620). The process 600 identifies multiple indicia corresponding to the zoom values (step 625). The process 600 displays indicia corresponding to a zoom value over a region of the thumbnail associated with the unstable segment (step 630). In some implementations, the system 100, described with reference to FIGS. 1-5, can be configured to perform the process 600.

In some implementations, the process 600 can detect a deletion of the indicia, and in response, remove the frames of the video clip in the unstable segment. Further, the process 600 can display an updated thumbnail in the user interface, that represents the video clip with the unstable segment removed. In some implementations, the process 600 can detect a selection of the indicia, and in response, remove frames of the video clip other than the frames in the unstable segment. The process 600 can display an updated thumbnail in the user interface, that represents the unstable segment. In some implementations, the process 600 can receive the zoom value from a video stabilization unit in response to providing the video clip to the video stabilization unit.

Figure 7:
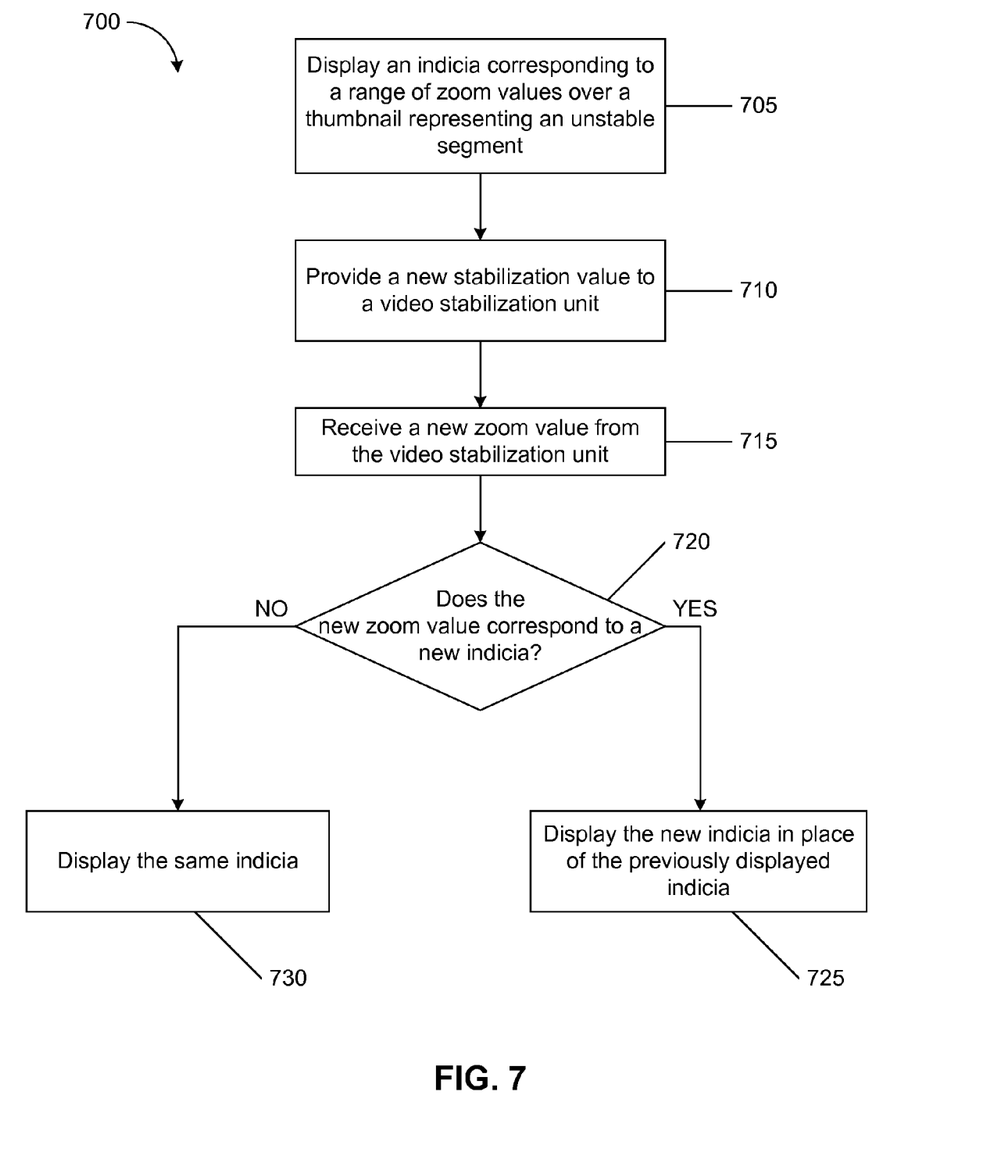
FIG. 7 is a flow chart of an example process for displaying indicia over unstable segments in a video clip.

FIG. 7 is a flow chart of an example process 700 for displaying indicia over unstable segments in a video clip. The process 700 displays an indicia corresponding to a range of zoom values over a thumbnail representing an unstable segment (step 705). The unstable segment is included in a video clip which the process 700 provides to a video stabilization unit. In response, the process 700 receives a zoom value from the video stabilization unit. The process 700 determines that the zoom value lies within a range of zoom values. The process 700 provides a new stabilization value to the video stabilization unit (step 710). In some implementations, the process 700 receives the new stabilization value from a user. The process 700 receives a new zoom value from the video stabilization unit (step 715). The process 700 checks if the new zoom value corresponds to a new indicia (step 720). If yes, then the process 700 displays the new indicia in place of the previously displayed indicia (step 725). If no, then the process 700 continues to display the same indicia as previously displayed (step 730). In some implementations, the system 100, described with reference to FIGS. 1-5 is configured to perform the process 700.

Figure 8:
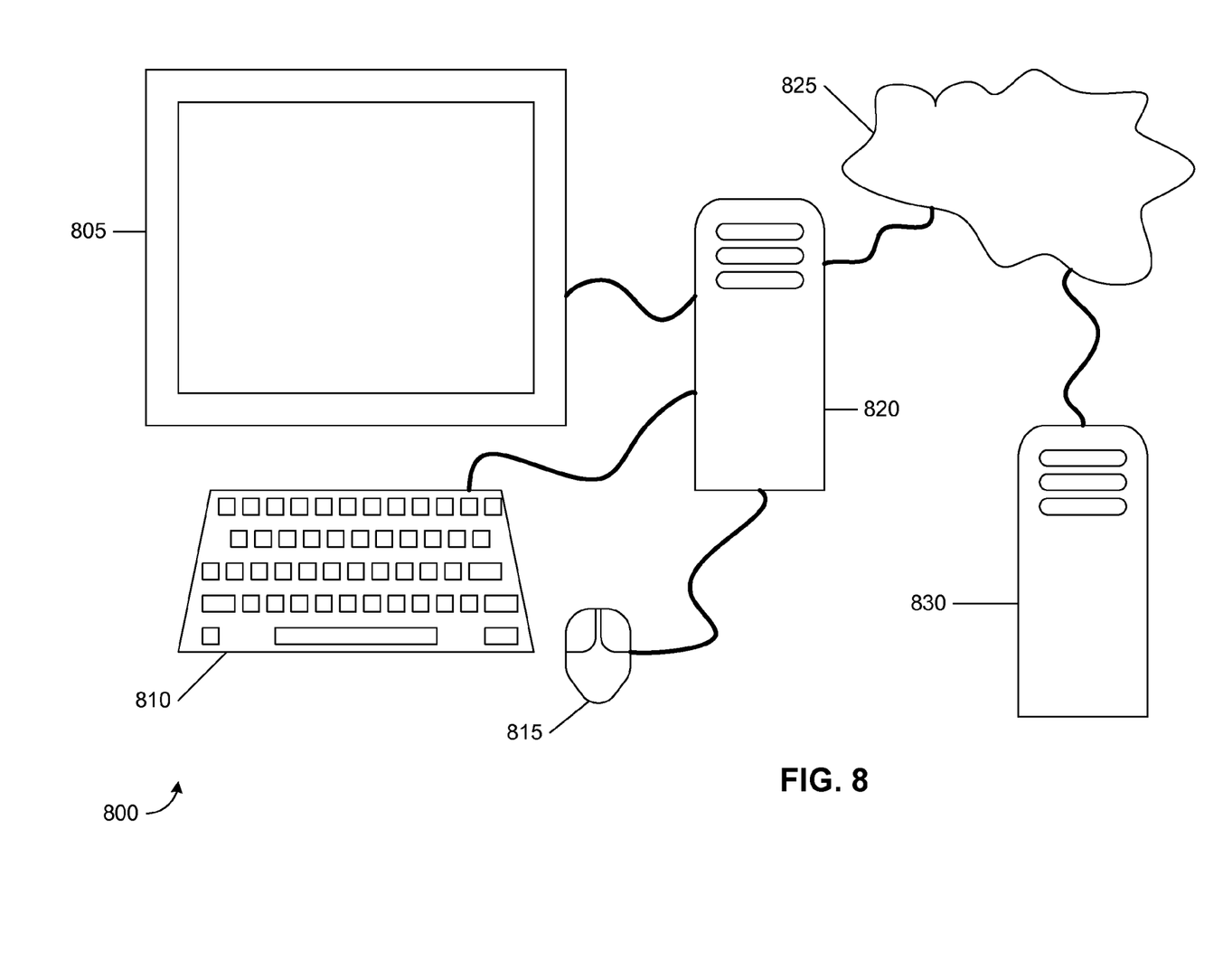
FIG. 8 is a schematic of a computer system.

FIG. 8 is a schematic of a computer system 800. In some implementations, the system 100 that can be implemented in a computer system 800. The computer system 800 can include a display device 805 in which the user interface 200 can be displayed. Input to the user interface can be received from input devices, for example, a keyboard 810, a mouse 815, and the like. Alternatively, or in addition, other input devices can also be used. The features described with reference to FIGS. 1-7 can be implemented as a computer software application installed in a computer 820. The display device 805 and the input devices can be operatively coupled to the computer 820. In some implementations, the computer software application can be installed at a remote server 830 that is operatively coupled to the computer 820 through one or more networks 825, for example, the Internet. Other implementations are also possible.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, tactile, or near-tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the specification or of what may be claimed, but rather as descriptions of features specific to particular implementations of the specification. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the specification have been described. Other implementations are within the scope of the following claims. For example, the actions recited in the claims can be performed in a different order and still achieve desirable results. In some implementations, the system 100 can associate other metadata to frames of the video clip. Subsequently, the system 100 can select frames based on one or more metadata including the frame metadata that represents the zoom values. For example, the system 100 can associate a time stamp to each frame of a video clip representing a time of recording. The system 100 can also associate zoom values to the frames as metadata. In response to input, the system 100 can filter the frames to display those frames that were recorded after a certain time stamp that also need to be zoomed in beyond a certain zoom value. In this manner, the zoom values can be used as keywords to filter portions of the video clip.

What is claimed is:

1. A computer-implemented method comprising:
receiving a zoom value associated with an unstable segment of a video clip, wherein the video clip includes a plurality of frames, the zoom value representing a value by which a subset of the plurality of frames that includes frames in the unstable segment need to be zoomed to stabilize the unstable segment;
displaying a thumbnail in a user interface, the thumbnail representing the video clip, wherein the thumbnail includes a plurality of regions that correspond to a plurality of frames in the video clip, wherein a particular region of the plurality of regions corresponds to the subset that includes the frames in the unstable segment; and
displaying an indicia representing the zoom value over the particular region in the thumbnail that corresponds to the unstable segment in the video clip.

2. The method of claim 1, further comprising:
receiving a selection of the indicia; and
in response to the selection, displaying a new thumbnail in the user interface, the new thumbnail including the frames of the video clip in the unstable segment.

3. The method of claim 1, further comprising:
detecting a deletion of the indicia;
in response to the deletion, removing the frames of the video clip in the unstable segment; and
displaying an updated thumbnail in the user interface, the updated thumbnail representing the video clip with the unstable segment removed.

4. The method of claim 1, further comprising:
detecting a selection of the indicia;
in response to the selection, removing frames of the video clip other than the frames of the video clip in the unstable segment; and
displaying an updated thumbnail in the user interface, the updated thumbnail representing the unstable segment.

5. The method of claim 1, wherein the zoom value is received from a video stabilization unit configured to stabilize unstable segments of the video clip, the method further comprising providing the video clip to the video stabilization unit.

6. The method of claim 1, wherein the indicia is represented by a line.

7. The method of claim 6, wherein the line is a red line when the zoom value is between 1.4 times and 1.5 times.

8. The method of claim 1, further comprising:
determining that the zoom value is greater than a threshold value; and
displaying, instead of the indicia representing the zoom value, another indicia representing an undesirability of stabilizing the unstable segment.

9. A non-transitory computer readable medium, tangibly embodying software instructions, which, when executed, cause a computer to perform operations comprising:
receiving a first range of zoom values that is associated with an unstable segment of a video clip, wherein the video clip includes a plurality of frames, the unstable segment includes a subset of the plurality of frames, and the first range of zoom values include values by which the subset need to be zoomed to stabilize the unstable segment to a stabilization level;
displaying a thumbnail in a user interface, the thumbnail representing the video clip, wherein the thumbnail includes a plurality of regions that correspond to a plurality of frames in the video clip, wherein a particular region of the plurality of regions corresponds to the subset;
displaying an indicia representing the first range of zoom values over the particular region;
receiving a second range of zoom values that is associated with the unstable segment of the video clip, wherein the second range of zoom values includes values by which the subset need to be zoomed to stabilize the unstable segment to a new stabilization level that is different from the stabilization level;
determining that the new the second range of zoom values is represented by a new indicia; and
displaying the new indicia in place of the indicia over the particular region in the thumbnail.

10. The computer-readable medium of claim 9, wherein the first range of zoom values is received from a video stabilization unit configured to stabilize the unstable segment based on the stabilization level, the video stabilization unit further configured to determine the values in the first range of zoom values, the operations further comprising:
providing the video clip to the video stabilization unit;
providing the stabilization level to the video stabilization unit; and
receiving the first range of zoom values.

11. The computer-readable medium of claim 10, wherein the new stabilization level is received as a user input, the operations further comprising:
providing the new stabilization level to the video stabilization unit; and
receiving the second range of zoom values.

12. The computer-readable medium of claim 9, the operations further comprising determining that a second zoom value included in the second range of zoom values is greater than a threshold zoom value, wherein the displayed new indicia corresponds to a value greater than the threshold zoom value.

13. A system comprising:
one or more processors; and
a non-transitory computer-readable medium tangibly embodying a computer program product comprising instructions which, when executed by the one or more processors, cause the one or more processors to perform operations comprising:
detecting input to stabilize a plurality of unstable segments included in a video clip by a stabilization level indicating a level to which the plurality of unstable segments of the video clip are to be stabilized;
displaying a thumbnail representing the video clip in a user interface, the thumbnail including a plurality of regions including a particular region that represent each unstable segment; and displaying a plurality of indicia in the thumbnail over particular regions that represent the plurality of unstable segments of the video clip, the plurality of indicia representing a corresponding plurality of zoom values by which the corresponding plurality of unstable segments must be zoomed to stabilize the plurality of unstable segments by the stabilization level.

14. The system of claim 13, wherein the plurality of indicia are represented by a corresponding plurality of colored lines.

15. The system of claim 13, the operations further comprising:
detecting an input to not stabilize the video clip; and
in response to the input, removing the plurality of indicia from the thumbnail.

16. A non-transitory computer readable medium, tangibly embodying software instructions, which, when executed, cause a computer to perform operations comprising:

receiving a zoom value associated with an unstable segment of a video clip, wherein the video clip includes a plurality of frames, the zoom value representing a value by which a subset of the plurality of frames that includes frames in the unstable segment need to be zoomed to stabilize the unstable segment;

displaying a thumbnail in a user interface, the thumbnail representing the video clip, wherein the thumbnail includes a plurality of regions that correspond to a plurality of frames in the video clip, wherein a particular region of the plurality of regions corresponds to the subset that includes the frames in the unstable segment; and displaying an indicia representing the zoom value over the particular region in the thumbnail that corresponds to the unstable segment in the video clip.

17. The medium of claim 16, the operations further comprising:
receiving a selection of the indicia; and
in response to the selection, displaying a new thumbnail in the user interface, the new thumbnail including the frames of the video clip in the unstable segment.

18. The medium of claim 16, the operations further comprising:
detecting a deletion of the indicia;
in response to the deletion, removing the frames of the video clip in the unstable segment; and
displaying an updated thumbnail in the user interface, the updated thumbnail representing the video clip with the unstable segment removed.

19. The medium of claim 16, the operations further comprising:
detecting a selection of the indicia;
in response to the selection, removing frames of the video clip other than the frames of the video clip in the unstable segment; and
displaying an updated thumbnail in the user interface, the updated thumbnail representing the unstable segment.

20. The medium of claim 16, wherein the zoom value is received from a video stabilization unit configured to stabilize unstable segments of the video clip, the method further comprising providing the video clip to the video stabilization unit.

* * * * *